R. V. JONES.
Raking Attachment to Harvesters.

No. 45,614. Patented Dec. 27, 1864.

Witnesses:
Theo Tusch
Wm Treurn

Inventor:
Robt V Jones
per Munn & Co
Attorneys.

UNITED STATES PATENT OFFICE.

ROBERT V. JONES, OF CANTON, OHIO.

IMPROVEMENT IN RAKING ATTACHMENTS TO HARVESTERS.

Specification forming part of Letters Patent No. 45,614, dated December 27, 1864.

*To all whom it may concern:*

Be it known that I, ROBERT V. JONES, of Canton, in the county of Stark and State of Ohio, have invented a new and Improved Raking Attachment for Reapers; and I do hereby declare that the following is a full, clear, and exact description thereof, which will enable others skilled in the art to make and use the same, reference being had to the accompanying drawings, forming part of this specification, in which—

Figure 1:
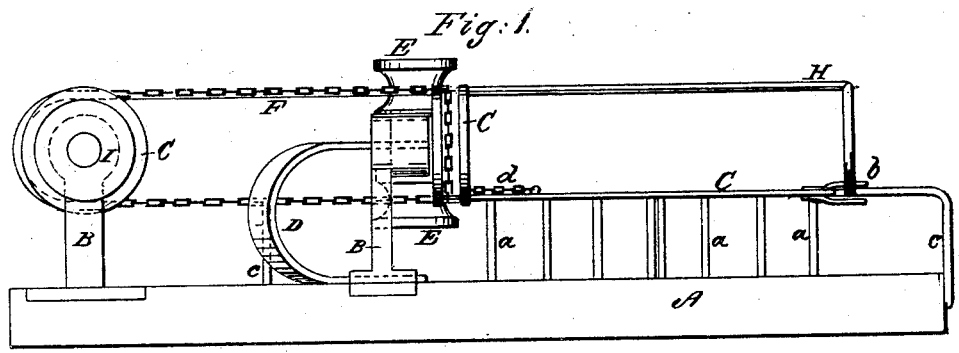
Figure 2:
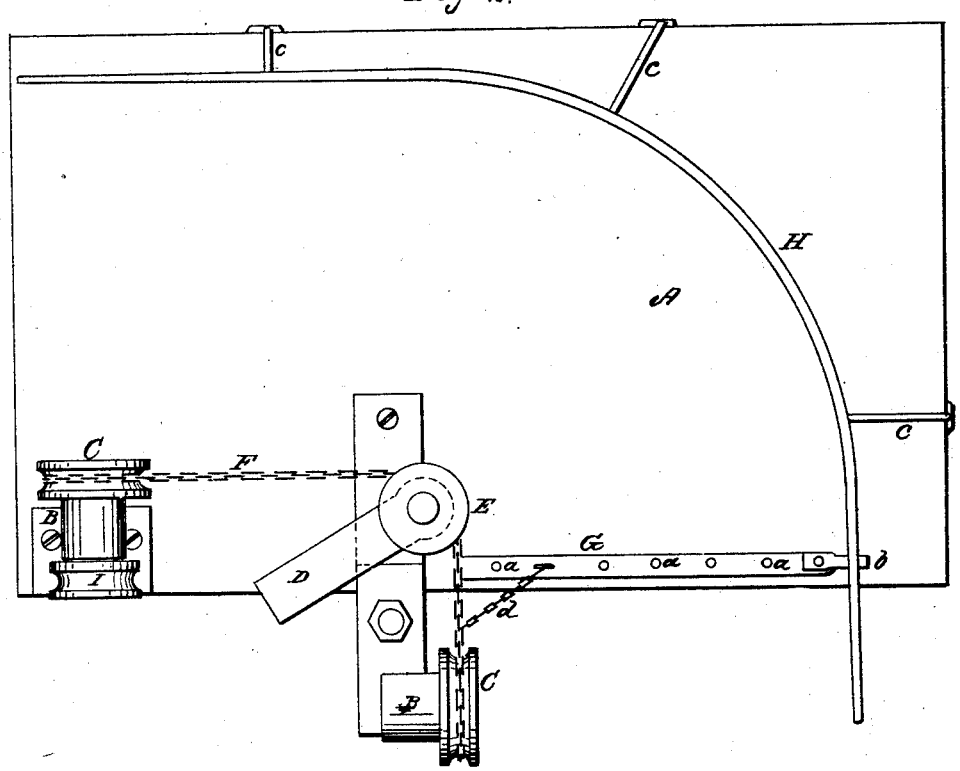

Figure 1 is a front view of my invention; Fig. 2, a plan or top view of the same.

Similar letters of reference indicate like parts.

This invention relates to a new and improved raking device for reapers.

The object of the invention is to obtain a device for the purpose specified which will be extremely simple in construction, operate perfectly, and be capable of being applied to any of the reapers in present use.

A represents the platform of a reaper, and B B' represent two standards, having bearings at their upper ends to receive shafts, to each of which a pulley, C, is keyed at one end. The shafts of these pulleys C are at right angles to each other, as shown clearly in Fig. 2.

D is a curved standard, having a vertical shaft at its upper end, on which pulleys E E are placed loosely, and these pulleys E E have such a position relatively to the pulleys C C as to keep a belt or chain, F, which passes around the latter, working in the path of a right angle, as will be fully understood by referring to Fig. 2.

To the belt or chain F the rake G is attached, which is simply a straight bar provided with teeth *a*, and having a fork, *b*, at its outer end to fit upon an endless guide, H, attached to the platform by means of brackets or bent supports *c*. This guide H is curved to correspond to the curve the outer end of the rake G describes in its movement given it by the belt or chain F, and the upper and lower parts of this guide are connected by semicircular portions, which admit of the outer and forked end of the rake passing from the lower to the upper part of the guide, and vice versa, as the inner or opposite end of the rake passes around the pulleys C C, the distance between the upper and lower parts of the guide being equal to the upper and lower parts of the belt or chain F or to the diameter of the pulleys C C. The rake-bar is placed or staved by a chain, *d*, from the belt or chain F. The shaft of one of the pulleys C has a driving-pulley, I, keyed upon it, over which the driving belt or chain works, power being taken from the shaft of the driving-wheel.

It will be seen from the above description that the rake has a continuous movement, and its fork *b* passes over the upper part of the guide H as it moves toward the front end of the platform, thereby clearing the falling grain on the platform, the rake, as it turns the front curved part of the guide, descending to its work and sweeping back over the platform as the fork *b* passes over the lower part of the guide, the fork *b* turning up the rear curved portion of the guide as soon as it reaches the rear of the platform and passes again in an elevated state to the front end of the same.

The whole arrangement is extremely simple and efficient, and it may be applied to any of the reapers in use.

I claim as new and desire to secure by Letters Patent—

The curved endless guide H, in combination with the endless belt F, provided with the rake G, and arranged in relation with pulleys to operate substantially in the manner as and for the purpose set forth.

ROBERT V. JONES.

Witnesses:
W. W. CLARK,
JOHN STABLER.